Patented Aug. 23, 1949

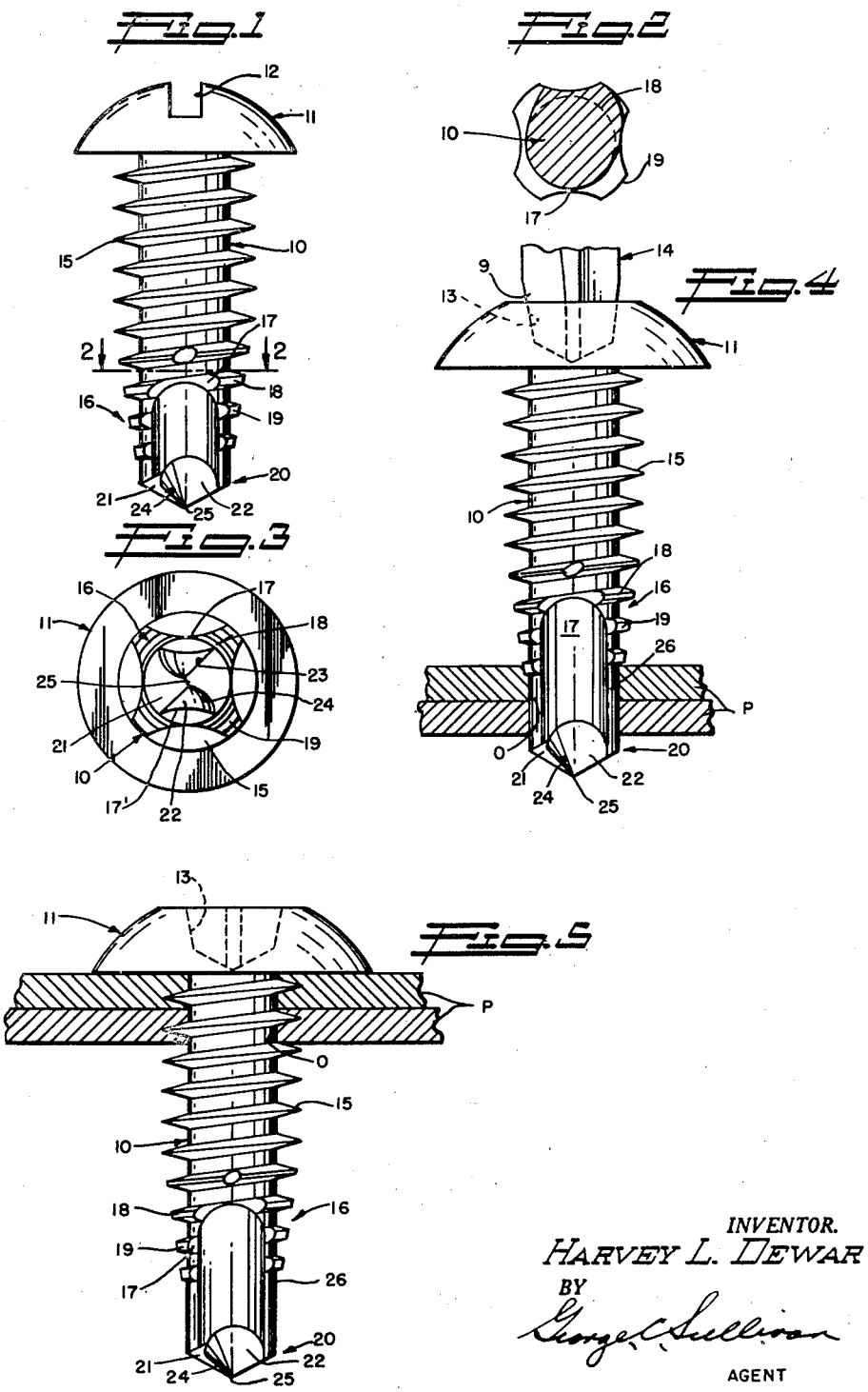

2,479,730

UNITED STATES PATENT OFFICE 2,479,730

SCREW

Harvey L. Dewar, Hollywood, Calif., assignor to Lockheed Aircraft Corporation, Burbank, Calif.

Application May 10, 1944, Serial No. 534,885

1 Claim. (Cl. 85—47)

This invention relates to securing, attaching and connecting means, and relates more particularly to screws. A general object of the invention is to provide practical, effective self-drilling and self-tapping screws.

In installing a conventional screw it is necessary to first drill or punch an opening in the work parts for the reception of the screw, and in most instances it is also necessary to cut or tap a thread on the wall of the opening to mate with the thread of the screw. The providing of the opening and the tapping of the thread are separate distinct operations and are merely preliminary to the actual installation of the screw. Self-tapping screws have been introduced but they are limited to use in certain materials or classes of material, and in any case, cannot be installed without first drilling or punching openings in the work for their reception.

It is an object of the invention to provide a screw that may be easily and quickly installed without the necessity of first drilling an opening in the work part or parts, and without tapping the opening thus formed to provide a thread for cooperating with the screw thread. The preliminary time consuming operations of forming an opening in the work and then tapping the opening are completely avoided, and a single operation is all that is required for the installation of the screw of the invention. The screw provided by this invention drills its own opening in the work parts, then cuts a thread on the wall of the opening and then screws into the opening to have its thread fully and dependably mate with the thread cut in the wall of the opening.

Another object of the invention is to provide a self-drilling and self-tapping screw that may be installed in one operation by employing a single tool. A conventional screwdriver, or a screwdriver designed to cooperate with the particular head of the screw, is all that is required for the complete installation of the screw.

A further object of the invention is to provide a screw of the character referred to that is operable to complete the drilling of the opening in the work parts before commencing to tap the opening thus drilled, thereby eliminating the possibility of stripping the thread from the wall of the opening during the early stages of the tapping operation. When installing the screw in certain classes of material, the drilling lead may be small with respect to the lead of tapping, and if the drilling and tapping are simultaneously performed the tap portion of the screw may cut out or strip away the thread as quickly as it is formed.

The invention provides a screw for use in such cases embodying a drill portion of sufficient length to fully penetrate the workpieces before the tap goes into operation so that the drilling does not impede or interfere with the tapping operation, and the tapping of the thread on the wall of the opening is performed subsequent to the drilling.

A still further object of the invention is to provide a self-drilling and self-tapping screw that is simple and inexpensive to manufacture and easy and convenient to use.

Other objects and features of the invention will be readily understood from the following detailed description of a typical preferred form of the invention wherein reference will be made to the accompanying drawings in which:

Figure 1 is a side elevation of a screw of the invention;

Figure 2 is a transverse sectional view taken as indicated by line 2—2 on Figure 1;

Figure 3 is a bottom elevation of the screw of Figure 1;

Figure 4 is a side elevation of a slightly modified form of the invention showing the drill portion forming an opening in the work parts; and Figure 5 is a view similar to Figure 4 illustrating the screw in its final position.

The two forms of screws of the invention illustrated in the drawings are substantially the same insofar as their general or main elements are concerned and corresponding reference numerals are applied to corresponding parts of the two embodiments. Each screw includes a body 10 having a head 11 at its outer end. The screw body 10 is cylindrical in shape and its diameter and length may vary in different applications of the invention. The head 11 is preferably a simple integral enlargement on the outer end of the screw body. The shape of the head 11 is optional or depends upon the intended use of the screw. In the drawings the screw heads 11 have flat under sides for engaging the work and have rounded or convex outer surfaces. Figure 1 shows a conventional screwdriver slot 12 in the head 11 while Figures 4 and 5 show the well known generally cross shaped recess 13 formed in the head 11 to receive a screwdriver bit 14 provided with four radial wings or tangs 9.

The body of the screw is provided with a thread 15. The thread 15 may extend throughout the major portion of the elongate screw body. The character of the thread 15 depends upon the intended purpose of the screw and the nature of the material in which the screw is to be used. I have shown a continuous thread 15 extending from the head 11 to the tap portion 16 to be subsequently described. While the thread 15 may be of a conventional V thread, I have shown a thread formed to have or leave a substantial base which constitutes the cylindrical surface of the screw body. The upper and lower surfaces of the thread 15 may have an equal pitch as shown, it being contemplated that in some cases the pitches of the thread surfaces may be different to adapt the screw for specified uses.

In accordance with the invention, the screw is provided with a tap 16 operable to cut a thread on the wall of an opening in the material of the work part or parts P. The tap 16 preferably constitutes the inner or entering portion of the thread 15. The tap 16 is defined by or results from the provision of a plurality of circumferentially spaced flats or flutes 17 ground or cut in the body of the screw and interrupting the end portion of the thread 15. The flutes 17 are preferably equally spaced around the screw body 10 and their walls may extend in generally parallel relation with the longitudinal axis of the body. Two of the flutes 17 may in effect have deepened lower portions where they join or merge with the notches 22 of the drill 20 to be subsequently described. The outer portions of the flutes 17 curve or incline outwardly to ultimately die out. I have shown four equally spaced flutes 17, it being understood that the flutes may be varied in number. In the drawings the flutes 17 are shown formed with curved concave walls. However, it is to be understood that they may have flat walls. The equally spaced grooves or flutes 17 interrupt the end portion of the thread 15 to leave equally spaced threaded lands 18 which constitute the thread cutting portions of the self-tapping screw. As clearly illustrated in the drawings, these tapping or thread cutting lands 18 carry segments or parts 19 of the thread 15. The lands 18 and their thread parts 19 may be relatively short in a circumferential direction. The thread parts 19 terminate at abrupt shoulders or corners to be effective in cutting the thread at the wall of the opening O in the parts P. The crests of the thread parts 19 are uniformly tapered toward a point in the longitudinal axis of the screw spaced beyond the entering end of the screw. This tapering of the tap thread parts 19 causes the parts to successively cut deeper into the material of the parts P until the tap 16 has finally cut a thread of full depth to mate with the thread 15 of the screw. The grooves or flutes 17 serve to clear or carry away the cuttings produced during the tapping operation. The tap 16 just described may be the same in the two illustrated embodiments of the invention.

It is a feature of the invention that the entering end of the screw body 10 is formed or shaped to constitute a drill 20. The particular formation of the drill 20 will, of course, depend upon the intended use of the screw and the drill may be varied somewhat to adapt the screw for use in materials of different characters. In the construction illustrated the drill 20 has a point 21 defined by a cone shaped surface. Two diametrically opposite grooves or notches 22 of upwardly diminishing depth are formed in the drill point 21. These notches 22 have concave walls and provide the point 21 with lips or cutting edges 23 and curved trailing edges or heels 24. In the particular construction illustrated, the drill point 21 has a rather narrow dead center or web edge 25. The included angle between the longitudinal axis of the screw and either cutting edge 23 may be varied to suit the screw for the drilling of different classes of materials.

The drill 20 of the two illustrated forms of the invention may be the same. It is to be noted, however, that in Figure 1 the thread parts 19 of the tap 16 extend to a point adjacent the drill 20, while in Figures 4 and 5 the screw body 10 has an elongate portion 26 separating the drill 20 from the tap 16. The flutes 17 extend outwardly through this plain unthreaded portion 26 and continue into the tap 16. In both forms of the invention the flutes 17 clear or carry away the chips or drill cuttings. Where the screw is provided with the plain unthreaded portion 26 between the tap 16 and the drill 20, the drill is adapted to fully penetrate the material or parts P before the tap engages the parts. Thus it will be noted that in Figure 4 the portion 26 has a length greater or at least as great as the thickness of the parts P so that the drill 20 may pass completely through the parts before the tap 16 comes into active engagement with the outermost part P. This allows the drilling operation to be performed under any selected pressure and at any lead, and insures the tapping of a full perfect thread in the parts P.

The screw, or at least the drilling and tapping portions of the screw may be heat treated, hardened or tempered to adapt the screw for use in the particular classes of materials into which it is to be driven.

In employing the screw of Figures 1, 2 and 3 its drill 20 is engaged with the work part at the point where the screw is to be installed. If desired, a lock washer may be arranged under the head 11 of the screw. The screw is rotated and forced or urged against the work part under suitable pressure as by employing a conventional screwdriver or a power driven screwdriver. This rotation is accompanied by axial pressure causing the drill 20 to cut or drill an opening in the material in which the screw is to be driven. As the drilling progresses, the tap parts 19 come into cooperation with the wall of the opening being drilled. In soft or relatively soft materials such as wood, plastics, soft metals, etc., the drilling lead and tapping lead will coincide and the tap 16 operates to cut a single continuous thread. Sufficient axial force is applied to the screw to insure that the drill advancement or lead will be as great as the lead of the tap. As the operation progresses, the thread 15 moves into the thread cut in the material by the tap 16. This engagement of the thread 15 with the tapped thread will provide for and assure uniform drilling and tapping advancement or lead. The rotation of the screw may be continued until the head 11 comes against the work part, whereupon the screw may be finally tightened down. During the drilling, tapping and screw-entering operation, the cuttings or chips clear through the flutes 17 and the thread 15. In the case of some relatively soft materials, the chips or cuttings may remain in the thread 15 to cause the screw to tightly bind in the material and thus provide a dependable connection or attachment.

The screw illustrated in Figures 4 and 5 is employed in the same manner. In this instance however, the drill 20 will completely penetrate the parts P before the tap 16 goes into operation. Figure 4 shows the drill 20 about to break through and leave the innermost part P, and shows the tap 16 still spaced from and entirely clear of the outer part P. It will be seen that the tap 16 cannot begin to form a thread in the wall of the opening O until the drilling operation has terminated. The screw may be rotated at any speed and at any pressure during the drilling operation to effect rapid drilling of the opening O. Likewise, when the drilling operation has been completed, only normal care is required in rotating the screw to tap or cut the thread in the opening O. Rotation of the screw following the cutting of the thread in the opening O brings the thread 15 into the drilled and tapped opening. The screw may be rotated until it has advanced to the point illustrated in Figure 5 where the head 11 is stopped against the outer part P.

While in most instances the screw will be employed but a single time, there are many cases in which the screw may be installed as described above and then unscrewed or removed to permit disconnection of the parts P. Subsequent to such removal the screw may be reused or reinserted. With proper hardening or heat treating the drill 20 and the tap 16 are not appreciably dulled when the screw is installed in most materials.

Having described only typical forms of the invention I do not wish to be limited to the specific details herein set forth, but wish to reserve to myself any variations or modifications that may appear to those skilled in the art or fall within the scope of the following claim.

I claim:

A self-drilling and self-tapping screw comprising an elongate screw body, a head on the outer end of the body of larger diameter than the body for engaging the part in which the screw is to be installed, the head having a recess in its outer end for receiving a tool for rotating the screw, a drill point on the inner end of the body having diametrically opposite notches providing cutting edges, a plain cylindrical portion of the body of the same diameter as the maximum diameter of the drill point extending from the point toward the head a distance at least equalling the thickness of the part in which the screw is to be installed, and a screw thread on the body extending from said plain portion of the body to the head, the crest of the part of the thread adjacent said plain portion of the body tapering inwardly toward said inner end of the body and toward the longitudinal axis of the body so that said part of the thread forms a tap for tapping a thread in the wall of said opening to mate with the thread on the body, said plain portion of the body having longitudinal flutes joining said notches and extending outwardly to interrupt and to die out in the tap portion of the thread on the body to provide edges thereon, the portion of the thread extending from said flutes to said head being continuous and uninterrupted.

HARVEY L. DEWAR.

REFERENCES CITED

The following references are of record in the file of this patent:

UNITED STATES PATENTS

| Number | Name | Date |
|---|---|---|
| 93,824 | Humphreys | Aug. 17, 1869 |
| 623,614 | Mueller | Apr. 25, 1899 |
| 1,006,532 | Casazza | Oct. 24, 1911 |
| 1,041,440 | Decker | Oct. 15, 1912 |
| 1,202,519 | Hively | Oct. 24, 1916 |
| 1,288,893 | Holmes | Dec. 24, 1918 |
| 1,539,628 | Bayer | May 26, 1925 |
| 1,638,230 | Alsaker | Aug. 9, 1927 |
| 2,062,550 | Brown | Dec. 1, 1936 |
| 2,165,011 | Rosenberg | July 4, 1939 |
| 2,292,195 | Brown | Aug. 4, 1942 |

FOREIGN PATENTS

| Number | Country | Date |
|---|---|---|
| 159,359 | Great Britain | Mar. 3, 1921 |
| 346,893 | Great Britain | Apr. 23, 1931 |